United States Patent
Kim et al.

(10) Patent No.: US 6,611,653 B1
(45) Date of Patent: Aug. 26, 2003

(54) ADAPTIVE DISPLAY SPEED AUTOMATIC CONTROL DEVICE OF MOTIONAL VIDEO AND METHOD THEREFOR

(75) Inventors: Hyeon Jun Kim, Kyungki-do (KR); Jin Soo Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/239,526

(22) Filed: Jan. 29, 1999

(30) Foreign Application Priority Data

Apr. 28, 1998 (KR) ........................................ 1998-15177

(51) Int. Cl.[7] .............................. H04N 5/91; H04N 7/26
(52) U.S. Cl. ........................................ 386/68; 386/111
(58) Field of Search .......................... 386/6–7, 68, 46, 386/1, 81–82, 111–112; 348/700–701, 451–452; 375/240.14

(56) References Cited

U.S. PATENT DOCUMENTS

| 5,532,833 A | * | 7/1996 | Hong et al. .................... 386/77 |
| 5,657,433 A | * | 8/1997 | Murase et al. ............... 395/133 |
| 5,754,728 A | * | 5/1998 | Nakajima et al. ............. 386/68 |
| 5,805,733 A | * | 9/1998 | Wang et al. ................. 382/232 |
| 5,892,520 A | * | 4/1999 | Ioka et al. .................. 345/474 |
| 6,192,183 B1 | * | 2/2001 | Taniguchi et al. ............ 386/52 |
| 6,356,178 B1 | * | 3/2002 | Isozaki ....................... 336/109 |
| 6,389,223 B1 | * | 5/2002 | Aotake ....................... 386/109 |

FOREIGN PATENT DOCUMENTS

| EP | 0 758 832 A2 | 2/1997 |
| JP | 62-263787 | 11/1987 |
| JP | 01068084 | 3/1989 |
| JP | 61-21282 | 4/1994 |
| JP | 09147472 | 6/1997 |
| KR | 1997-50822 | 7/1997 |

OTHER PUBLICATIONS

European Search Report.
Y. Nakamima, "A Video Browsing Using Fast Scene Cut Detection for an Efficient Networked Video Database Access;" 2334D IEICE Transactions on Information and Systems; Dec., 1994 pp. 1355–1364.

* cited by examiner

Primary Examiner—Thai Tran
Assistant Examiner—Polin Chieu
(74) Attorney, Agent, or Firm—Fleshner & Kim, LLP

(57) ABSTRACT

An automatic control device and method for an adaptive display speed of a motion video is disclosed. The present invention is capable of adaptively controlling acceleration and speed change of a motion video according to the variation rate of the motion video within the interval of fast forward or slow motion modes.

20 Claims, 2 Drawing Sheets

Figure 1:
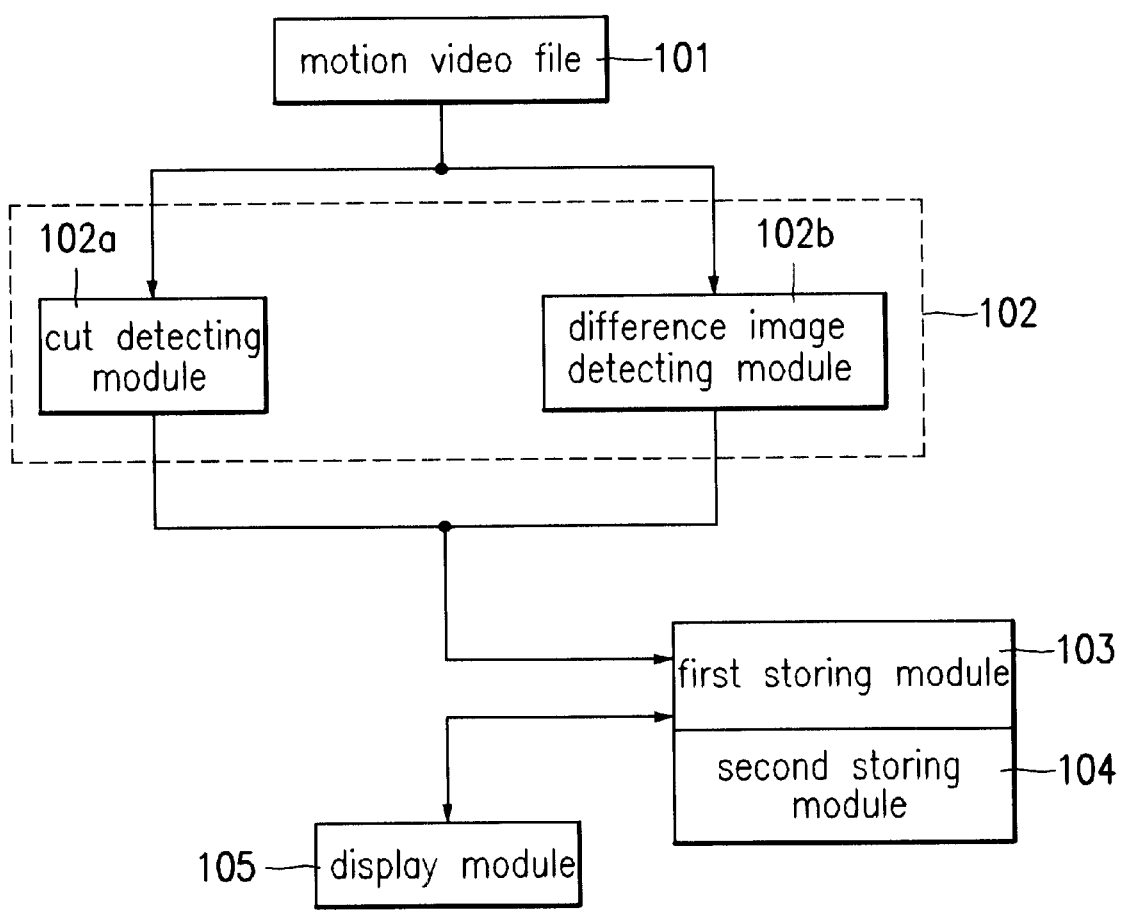

ADAPTIVE DISPLAY SPEED AUTOMATIC CONTROL DEVICE OF MOTIONAL VIDEO AND METHOD THEREFOR

BACKGROUND OF THE INVENTION

1. Field of the Invention

The present invention relates to a motion video system and method, and more particularly to an automatic speed control of a motion video display.

2. Discussion of Related Art

During a reproduction of a motion video, a user wishing to change the speed of the reproduction may enter a command to view the reproduction in fast forward or in slow motion. However, because the reproduction in fast forward or slow motion mode is maintained at a constant speed during such modes, the display speed may not satisfy a user's visual senses.

For example, the motion video is quickly displayed in the fast forward mode regardless of whether the variations of the scenes on the screen are high, making it difficult for a user to recognize or comprehend such portions of the motion video, On the other hand, when the variations of the scenes on the screen is low, even the quick speed of the fast forward mode may become tedious for a user.

Similarly, the display speed of the motion video is slowed in the slow motion mode regardless of whether the scene variations on the screen are high. Thus, in such portions of the motion video, the user would visually feel as if the display speed has not changed even though the display speed has been slowed. However, when the scene variations are low, the slowed display speed may be too slow making it tedious for the user.

Typically, a fast forward mode is aimed to provide a high speed search and a slow motion mode to provide a detailed search for a specific scene or action in a motion video. Therefore, in consideration of the user's visual sensing capabilities, the speed of display should be slower relative to the fixed display speed in either the fast forward or slow motion modes when the variation of motion is high or when the scene changes are frequent in the motion video. On the other hand, the speed of display should be faster relative to the fixed display speed in either the fast forward or slow motion modes when the variation of motion is low in the motion video.

However, because of the fixed display speed in both the conventional fast forward and slow motion modes, the sensing demands of the user as discussed above cannot be not met appropriately. Namely, if the motion video is displayed in the fast forward or slow motion modes in the conventional device, the motion video is reproduced at a fixed speed, either fast or slow display speed. Accordingly, the user cannot dynamically display the motion video within the fast forward or slow motion mode.

As a result, in the fast forward mode, the user cannot achieve a satisfactory reproduction at scenes of the motion video when the motion variation is minimal because of the rather slow screen changes. Likewise, the user would have difficulty in searching for a particular scene or action at scenes of the motion video when the motion variation is high or when the scene changes are frequent because of the rather faster display speed than expected.

In the slow forward mode, the user cannot achieve a satisfactory reproduction at scenes of the motion video when the motion variation is minimal because of the too slow screen changes. The user also cannot achieve a detailed display at scenes of the motion video when the motion variation is high or when the scene changes are frequent because of the rather fast screen changes

SUMMARY OF THE INVENTION

Accordingly, an object of the present invention is to solve at least the problems and disadvantages of the related art.

An object of the invention is to provide an adaptive display of a motion video by automatically controlling the display speed of the motion video based upon the level of motion in the motion video.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, an automatic control for an adaptive display speed of a motion video and method thereof according to the present invention is characterized by changing a reproduction speed within a fast forward interval based upon the distance (or number of frames) between cuts, where the motion video is in the fast forward mode; and changing the reproduction speed within a slow motion interval based upon the variation of motion in the motion video by detecting image difference between the frames; such that the reproduction speed within the fast forward or slow motion interval can be dynamically controlled according to the features of the motion video, thereby satisfying a user's visual characteristic.

BRIEF DESCRIPTION OF THE ATTACHED DRAWINGS

Figure 2:
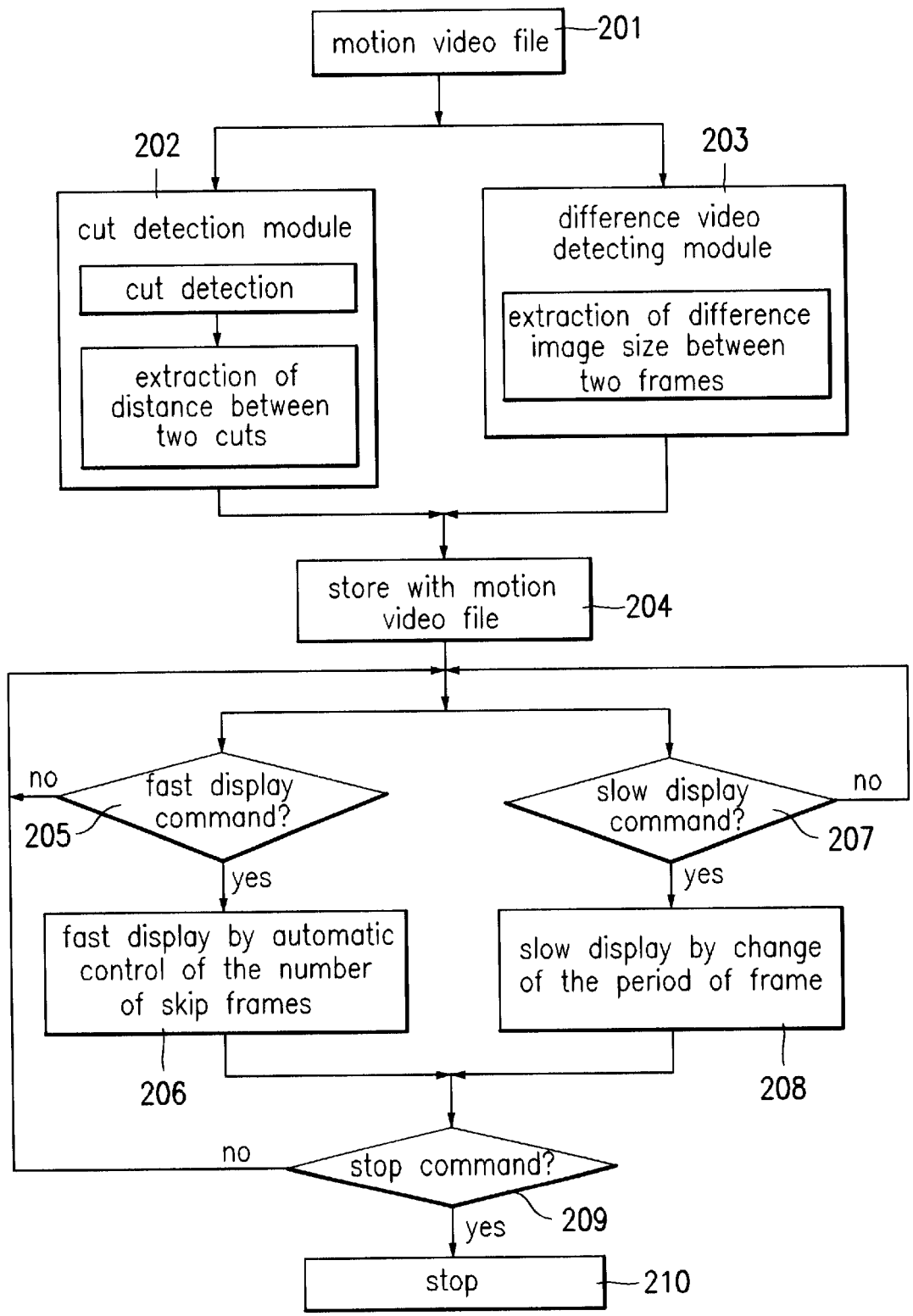

The invention will be described in detail with reference to the following drawings in which like reference numerals refer to like elements wherein:

FIG. 1 is a block diagram illustrating an automatic control device for an adaptive display speed of a motion video according to the present invention; and FIG. 2 is a flowchart illustrating an automatic control method for an adaptive display speed of a motion video according to the present invention.

DETAILED DESCRIPTION OF PREFERRED EMBODIMENT

Reference will now be made in detail to the preferred embodiments of the present invention, examples of which are illustrated in the accompanying drawings.

FIG. 1 is a block diagram illustrating an automatic control device for a dynamic display speed of a motion video according to the present invention. As shown in FIG. 1, the automatic control device comprises: a motion video file 101; a speed adjusting information detecting module 102 controlling a reproduction speed of the motion video file 101 during a fast forward (FF) or slow motion (SM) interval; a first storing module 103 storing a dynamic speed motion video data; a second storing module 104 storing a constant speed motion video data; and a display module 105 determining the variation of the motion video based upon the number of frames between the cuts and the difference image between the frames to momentarily increase/decrease a display speed within the fast forward (FF) or slow motion (SM) interval.

The speed adjusting information detecting module 102 further includes a cut detecting module 102a extracting cuts in the motion video and calculating the number of frames between two cuts to thereby detect variation of the motion video; and a difference video detecting module 102b obtaining a difference image between the two frames in the motion video.

Particularly, the cut detecting module 102a extracts and stores the detected cuts for determining the change of scenes, the indexing of the detected cuts and the distance information (the number of frames) between the cuts. The difference video detecting module 102b detects the difference image between two adjacent frames, and stores the variation of the motion (video motion).

For a fast display speed, the display module 105 has an algorithm relating the distance between the cuts to the display speed, by which the display speed can be dynamically adjusted according to the distance between the detected cuts. For a slow display speed, the display module 105 also has an algorithm relating the variation of the motion to the display speed, by which the display speed can be dynamically adjusted according to the detected variation of the motion.

FIG. 2 is a flowchart illustrating an automatic control method for the adaptive display speed of a motion video according to the present invention and an explanation of the method made in reference to FIG. 1.

In step 201, the automatic control method reads a motion video file 101. Subsequently, the cut detecting module 102a and the difference video detecting module 102b simultaneously perform the cut detection and the difference image detection in steps 202 and 203. Afterwards, in step 204, the detected information is stored together with the original motion video file in the first and second storing modules 103 and 104, respectively.

Particularly, the cut detection in step 202 by the cut detecting module 102a is performed in the following manner. A cut is defined as the points dividing the scenes of the motion video. A cut is detected when the displayed scene drastically changes, e.g. when the position and background are changed. The detected cuts are indexed, and the number of frames between the cuts (distance information) are calculated and stored together with the motion video file in step 204.

The method (algorithm) for detecting such cuts and the number of frames between the cuts may be achieved by one of many existing algorithms.

However, in the present invention a color histogram is used to obtain the distance information. Namely, a cut is detected between two consecutive frames when a difference of the color histograms corresponding to the two consecutive frames is over a threshold value. The distance between the cuts, i.e. the distance information between two consecutive cuts, is indicated by the number of frames between the two detected cuts.

The position of the cut and the distance information between the cuts are stored as a new motion video file in the second storing module 104 together with the original motion video file 101 of consecutive frames. One memory may be used for both the second storing module 104 and the first storing module 103 by appropriately distributing the memory area. The memory may store the data necessary for either a FF or SM display interval in any manner. Moreover, the calculated skip frames or the period of frames which will be discussed below may be stored in the first module 103 rather than the cut information and the distance information.

The difference image detection in step 203 by the difference video detecting module 102b is performed in the following manner. The size of the difference image is the difference in the motion between two adjacent frames. The difference image size is large when the motion between two frames is high or when the scene changes between two frames. Thus, the size of the difference image is obtained by subtracting the pixel values corresponding to the (n)th frame and the (n+1)th frame.

Afterwards, in step 204, the information of the difference image size is stored in the second storing module 104 together with the original motion video file 101 of consecutive frames. As discussed above, the cut detection information and the difference image detection information are stored together with the original motion video file 101.

Upon receiving a command for FF or SM from a user, a dynamic speed control is possible by using the stored cut detection information and the difference video detection information. The dynamic speed control is performed in steps 205 through 210, by the display module 105 of FIG. 1.

For the FF display speed, the number of skip frames is adjusted and the speed is adaptively controlled within the FF display interval. For SM display speed, the time period of the frames is changed and the speed is adaptively controlled within the SM display interval.

An explanation of the operation for the dynamic speed control during the FF display mode selected by the user will next be given. If the user desires to display the motion video in the fast forward mode, the motion video is displayed at a relatively slower speed compared to the original FF display speed within the FF display interval when the variation displayed on the screen is fast. If the variation displayed on the screen is minimal, the motion video is displayed at the relatively faster speed compared with the original FF display speed. Accordingly, the user can recognize a variation in the display speed, such that the user may search the motion video at the nearly constant recognition level.

Since the number of skip frames is fixed in the conventional fast display speed of the motion video, the fast display is performed even in the interval with important frames, which fails to provide a detailed search to the user. As discussed above, however, the dynamic speed control method according to the present invention solves this problem.

In the conventional fast display speed, the original frames are skipped at a constant interval, of about 5 frames, and displayed. In the present invention, the conventional fast or slow display is defined as a normal fast or slow display, and the adaptive acceleration/change speed display or the normal fast/slow speed display is selectively achieved according to the command of the user.

In step 205, a determination is made whether a user desires a FF display. If a FF display command is received, the display module 105 performs the display control in step 206 to achieve the adaptive acceleration/change speed control for the FF display interval. Particularly, the number of skip frames is adjusted by the algorithm of the following equations;

$$\text{Skip\_}k = \text{integer}[\text{Dist}(k)/(a\text{Dist}(k)+b)] \quad (1)$$

$$\text{If } (\text{Dist}(k)<b) \text{ then Skip\_}k=1 \quad (2)$$

wherein, the 'Skip_k' is the number of skip frames, which is applied to the frames between (k)th cut and (k+1)th cut, the 'Dist(k)' represents the distance information (total number of frames) between the two consecutive cuts, a constant 'a' determines the degree of an automatic speed control according to the size of the Dist(k), a constant 'b' defines a minimum display time required for displaying the distance between the cuts, and an 'integer' is an integer of the calculated value.

If the distance between the cuts is shorter than the minimum display time 'b', the motion video is displayed at a normal speed by the equation (2), preventing the information of the displayed interval from being lost. Since the value 'Dist(k)' and the constant values 'a' and 'b' are predetermined, when the distance between the cuts is long, i.e. the value 'Dist(k)' is high, the number of skip frames 'Skip_k' increases such that the motion video is displayed at a relatively faster speed in the FF display interval. On the other hand, when the distance between the cuts is short, i.e. the value 'Dist(k)' is low, the number of skip frames 'Skip_k' decreases such that the motion is displayed at a relatively slower speed in the FF display interval.

As the whole speed adjusting coefficient 'b' and the relative speed adjusting coefficient 'a' are appropriately designated, the number of skip frames 'skip_k' and the distance between the cuts are considered to thereby change the degree of the automatic speed control. When the constant 'a' is '0', all the intervals between the cuts are displayed for the minimum display time 'b' regardless of the length of each interval, and when the constant 'b' is '0', all the intervals between the cuts are displayed at a speed faster than the normal display speed by a factor of 1/a.

An explanation of the operation for the dynamic speed control during the SM display mode selected by the user will next be given. If the user desires to display the motion video at the slow display speed, such as when the motion in motion video is high, the motion video is displayed at the relatively slower speed compared with the original slow display speed within the SM display interval. When the motion in motion video is low, the motion video is displayed at the relatively faster speed compared with the original slow display speed. Accordingly, the user recognizes a constant variation in the display speed, such that the user may performs a detailed search of the motion video at the nearly constant recognition level.

Since the period of the frame is fixed in the conventional slow display speed of the motion video, the slow display is performed even in the interval without important frames, which provides a tedious searching process to the user. As discussed above, however, the dynamic speed control method according to the present invention solves this problem.

In this case, the period of frame is defined as the time in which one frame is displayed on the screen and an original time period in the normal display mode will be expressed as 'Torig'. In the conventional slow display speed, the period of the frame is designated to be larger than that of the original frame period, thereby displaying the motion video at the slow display speed. In the present invention, the conventional slow display is defined as a normal slow display, and one of the adaptive acceleration/change speed display or the normal slow display is selectively achieved according to the commands of the user.

In step 207, a determination is made whether the user desires a SM display mode. If a slow display command is received from the user, the display module 105 performs the display control in step 208 to achieve the adaptive acceleration/change speed control for the SM display interval. Particularly, the period of frame is adjusted by the algorithm of the following equations:

$$T(n)=T\text{orig}(n)*m\text{Diff}(n)*\beta$$

$$T(n)=T\text{min, if } T(n)<T\text{min}$$

where 'T' (n)' represents the changed period of an (n)th frame; the 'Torig' is the original period of frame, e.g. 1/30 seconds in NTSC; the 'mDiff(n)' is a size of difference image between the (n)th frame and the adjacent frame; the 'Tmin' is a minimum period of frame which is dependent upon the device; and the 'β' is a speed control coefficient for determining the degree of automatic speed control.

The values 'Torig(n)', 'Tmin', and 'β' are predetermined and when the size of difference video 'mDiff(n)' is large, the period of frame 'T (n)' increases such that the motion video is displayed at a relatively slower speed in the SM display interval. On the other hand, when the size of difference video 'mDiff(n)' is small, the period of frame 'T (n)' decreases such that the motion video is displayed at a relatively faster speed in the SM display interval.

As the speed adjusting coefficient 'β' in the slow display algorithm is appropriately designated, the period of frame and the size of difference video are considered to change the degree of the automatic speed control.

The adaptive display speed automatic control within the FF or SM display interval is continued until stop command is received from the user in step 209. If the stop command is selected, the change speed display stops in step 210 and return to step 201 of reading the motion file.

As discussed above, the automatic control device for an adaptive display speed of a motion video and method thereof is capable of dynamically controlling the speed of the motion video within the FF or SM interval in consideration of the user's visual characteristics, when the motion video is displayed in the fast or slow display speed.

For example, in case of the fast display speed, the user can search the motion video when the variation of scenes is not drastic at relatively faster display speed, and the user can search the motion video when the variation of scenes is drastic at relatively slower display speed.

On the other hand, in case of the slow display speed, the user can search the motion video when the variation of motion is not drastic at relatively faster display speed, and the user can search the motion video when the variation of motion is drastic at relatively slower display speed.

If the motion video is displayed at the relatively faster or slower display speed than the conventional fast or slow speed within the FF or SM interval, the user can enjoy a detailed search of the motion video where variation of motion is dynamic such as a sports broadcasting program, and a high speed search of the motion video where variation of motion is static such as a concert program.

In addition, the present invention can selectively perform the existing normal fast or normal slow display as well as the adaptive acceleration/change speed control, in which the degree of speed change is determined by the establishment of the automatic speed control coefficients, thereby achieving the reproduction speed to satisfy an object of a user's search.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. An automatic control method for adaptive display speed of a motion video, comprising:
    (a) detecting cuts in a received motion video file and detecting a number of frames between the cuts, and obtaining a size of a difference image derived between a prescribed number of frames in the motion video file, wherein the prescribed number of frames in the motion video file is less than the number of frames between the cuts;

(b) storing new motion video data containing information corresponding to the detected cuts and information corresponding to the size of the difference image, and the motion video file; and (c) displaying the motion video at a variable display speed according to the new motion video data and data in the motion video file.

2. The method of claim 1, wherein the step of detecting cuts in step (a) comprises:

building a color histogram for each of a predetermined number of frames of the motion video data; and designating a cut when a difference of the color histograms corresponding to two consecutive frames is over a predetermined threshold value.

3. A method of claim 1, wherein the step of obtaining the difference image in step (a) comprises the step of subtracting the pixel values corresponding to the (n)th frame and the (n+1)th frame.

4. The method of claim 1, wherein step (c) comprises displaying the motion video at a variable speed slower than a normal display speed during a slow motion display, wherein the variable speed is determined based upon the size of the difference image.

5. An automatic control device for adaptive display speed of a motion video, comprising:

a motion video detecting unit which detects cuts in a received motion video file and a number of frames between the cuts, and which determines a size of a difference image derived between frames in the motion video file, wherein the size of the difference image is based on a difference of pixel values included in two consecutive frames in the motion video file;

a memory which stores new motion video data containing information corresponding to the detected cuts and information corresponding to the size of the difference image, said memory also storing the motion video file; and a display module which displays motion video at a variable display speed according to the new motion video data and data in the motion video file stored in the memory.

6. The device of claim 1, wherein the motion video detecting unit comprises:

a cut detecting module detecting cuts in the motion video file and detecting the number of frames between the cuts; and a difference image detecting module obtaining a difference image between the frames in the motion video file.

7. The device of claim 1, wherein the memory comprises;

a first storing module storing the new motion video data containing the detected cut information; and a second storing module storing the difference image information, said memory also storing the original motion video file received.

8. The device of claim 1, wherein the display module displays the motion video at a variable speed slower than a normal display speed during a slow motion display, wherein the variable speed is determined based upon the size of the difference image.

9. An automatic control device for adaptive display speed of a motion video, comprising:

a motion video detecting unit which detects cuts in a received motion video file and detects a number of frames between the cuts, and obtains a difference image between at least two frames in the motion video file;

a memory for storing new motion video data including information corresponding to the detected cuts and information corresponding to the difference image, said memory also storing the motion video file; and a display module which displays motion video at a variable display speed according to the new motion video data and data in the motion video file stored in the memory, wherein the display module displays the motion video at a variable speed faster than a normal display speed during a fast forward display, and wherein the variable speed is determined based upon the number of frames between cuts.

10. The device of claim 9, wherein the variable speed is controlled by a number of skip frames and wherein the number of skip frames is based upon the number of frames between cuts.

11. The device of claim 10, wherein the number of skip frames is adjusted by the following equation:

$$\text{Skipk}\_k = \text{integer}[\text{Dist}(k)/(a\text{Dist}(k)+b)]$$

where the 'Skip_k' is the number of skip frames for the frames between (k)th cut and (k+1)th cut, the 'Dist(k)' represents the total number of frames between two consecutive cuts, 'a' is a predetermined constant, 'b' is a predetermined constant, and an 'integer' is an integer of the calculated value.

12. The device of claim 11, wherein if the constant 'a' is '0', all the intervals between the cuts are displayed for the minimum display time 'b' regardless of the length of each interval, and if the constant 'b' is '0', all the intervals between the cuts are displayed at the faster display speed by 1/a than the speed in the normal display.

13. An automatic control device for adaptive display speed of a motion video, comprising:

a motion video detecting unit which detects cuts in a received motion video file and detects a number of frames between the cuts, and obtains a difference image between at least two frames in the motion video file; and a memory for storing new motion video data including information corresponding to the detected cuts and information corresponding to the difference image, said memory also storing the motion video file;

a display module displays the motion video at a variable speed slower than a normal display speed during a slow motion display, wherein the variable speed is determined based upon a size of the difference image, wherein the variable speed is controlled by a frame period, and wherein the frame period is based on the number of frames between the cuts.

14. The device of claim 13, wherein the period of frame is adjusted by the following equation:

$$T(n) = T\text{orgi}(n) * m\text{Diff}(n) * \beta$$

$$T(n) = T\min, \text{ if } T(n) < T\min$$

where 'T(n)' represents the changed period of an (n)th frame; the 'Torig' is the original period of frame; the '$m$Diff(n)' is a size of difference image between the (n)th frame and the adjacent frame; the 'Tmin' is a minimum period of frame; and the '$\beta$' is a predetermined constant.

15. An automatic control method for adaptive display speed of a motion video, comprising:

(a) detecting cuts in a received motion video file and detecting a number of frames between the cuts, and obtaining a difference image between at least two frames in the motion video file;

(b) storing new motion video data containing information corresponding to the detected cuts and information corresponding to the difference image, and the motion video file; and (c) displaying motion video at a variable display speed according to the new motion video data and data in the motion video file, wherein step (c) comprises displaying the motion video at a variable speed faster than a normal display speed during a fast forward display, and wherein the variable speed is determined based upon the number of frames between the cuts.

16. The method of claim 15, wherein the variable speed is controlled by a number of skip frames and wherein the number of skip frames is based upon the number of frames between cuts.

17. The method of claim 16, wherein the number of skip frames is adjusted by the following equation:

$$\text{Skipk}\_k = \text{integer}[\text{Dist}(k) \ (a\text{Dist}(k) + b)]$$

where the 'Skip_k' is the number of skip frames for the frames between (k)th cut and (k+1)th cut, the 'Dist(k)' represents the total number of frames between two consecutive cuts, 'a' is a predetermined constant, 'b' is a predetermined constant, and an 'integer' is an integer of the calculated value.

18. The method of claim 17, wherein if the constant 'a' is '0', displaying all the intervals between the cuts for the minimum display time 'b' regardless of the length of each interval, and if the constant 'b' is '0', displaying all the intervals between the cuts at the faster display speed by 1/a than the speed in the normal display.

19. An automatic control method for adaptive display speed of a motion video, comprising:

(a) detecting cuts in a received motion video file and detecting a number of frames between the cuts, and obtaining a difference image between at least two frames in the motion video file;

(b) storing new motion video data containing information corresponding to the detected cuts and information corresponding to the difference image, and the motion video file; and (c) displaying motion video at a variable display speed according to the new motion video data and data in the motion video file, wherein step (c) comprises displaying the motion video at a variable speed slower than a normal display speed during a slow motion display, wherein the variable speed is determined based upon a size of the difference image, wherein the variable speed is controlled by a frame period, and wherein the frame period is based upon the number of frames between the cuts.

20. The device of claim 19, wherein the period of frame is adjusted by the following equation:

$$T(n) = T\text{origi}(n) * m\text{Diff}(n) * \beta$$

$$T(n) = T\text{min, if } T(n) < T\text{min}$$

where 'T(n)' represents the changed period of an (n)th frame; the 'Torig' is the original period of frame; the 'mDiff(n)' is a size of difference image between the (n)th frame and the adjacent frame; the 'Tmin' is a minimum period of frame; and the 'β' is a predetermined constant.

* * * * *